United States Patent
Widiaman et al.

(10) Patent No.: US 10,061,347 B2
(45) Date of Patent: Aug. 28, 2018

(54) PROTECTIVE JACKET WITH A KICKSTAND

(71) Applicant: HEWLETT-PACKARD DEVELOPMENT COMPANY, L.P., Houston, TX (US)

(72) Inventors: Rudy Widiaman, Houston, TX (US); Eric Chen, Houston, TX (US); Vincent Kenya Shyu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/309,824

(22) PCT Filed: Aug. 29, 2014

(86) PCT No.: PCT/US2014/053540
§ 371 (c)(1),
(2) Date: Nov. 9, 2016

(87) PCT Pub. No.: WO2016/032529
PCT Pub. Date: Mar. 3, 2016

(65) Prior Publication Data
US 2017/0269633 A1   Sep. 21, 2017

(51) Int. Cl.
| | |
|---|---|
| H05K 7/00 | (2006.01) |
| H05K 5/00 | (2006.01) |
| G06F 1/16 | (2006.01) |
| A45C 11/00 | (2006.01) |
| G06K 7/00 | (2006.01) |

(52) U.S. Cl.
CPC ............ G06F 1/1626 (2013.01); A45C 11/00 (2013.01); G06F 1/1656 (2013.01); G06K 7/0013 (2013.01); *A45C 2011/002* (2013.01); *A45C 2011/003* (2013.01); *A45C 2200/15* (2013.01); *G06F 2200/1633* (2013.01)

(58) Field of Classification Search
CPC ...................................................... G06F 1/1632
USPC ...................................................... 361/679.01
See application file for complete search history.

(56) References Cited

U.S. PATENT DOCUMENTS

| | | | |
|---|---|---|---|
| 6,651,881 | B1 | 11/2003 | Choiset |
| 8,352,034 | B2 | 1/2013 | Berg et al. |

(Continued)

FOREIGN PATENT DOCUMENTS

| | | |
|---|---|---|
| CN | 202772938 U | 3/2013 |
| EP | 2703939 A1 | 3/2014 |

(Continued)

OTHER PUBLICATIONS

"HP Elitepad Security Jacket with Smart Card Reader and Fingerprint Reader," Sep. 2013, 1-page, Hewlett-Packard Development Company, L.P.

(Continued)

*Primary Examiner* — Jerry Wu
(74) *Attorney, Agent, or Firm* — HPI Patent Department

(57) ABSTRACT

A protective jacket for enclosing a portable computer device in accordance with one example included an electronic reader to receive an electronic device, and a cover movably attached to the jacket. The cover is to the electronic reader when the cover is in a closed position and to function as a kickstand to support the device in a plurality of viewing angles when the cover is in an open position.

15 Claims, 4 Drawing Sheets

(56) References Cited

U.S. PATENT DOCUMENTS

| | | | |
|---|---|---|---|
| 2012/0006950 A1 | 1/2012 | Vandiver | |
| 2012/0314354 A1* | 12/2012 | Rayner | H01H 13/06 361/679.01 |
| 2013/0063004 A1 | 3/2013 | Lai et al. | |

FOREIGN PATENT DOCUMENTS

| | | |
|---|---|---|
| JP | 08-314569 A | 11/1996 |
| KR | 20-0271501 Y1 | 5/2002 |
| TW | 428150 | 4/2001 |
| TW | 562287 | 11/2003 |
| TW | M385188 U | 7/2010 |
| TW | M417758 U1 | 12/2011 |

OTHER PUBLICATIONS

"QuickSpecs: HP ElitePad 1000 G2," Feb. 10, 2014, pp. 1-25, Hewlett-Packard Development Company, L.P.

"QuickSpecs: iPAQ Universal Wireless Rugged Case," Dec. 2, 2004, pp. 1-4. DA-11641, Version 4, Hewlett-Packard Develoment Company, L.P.

AT&T and Incipio introduce new 'Cashwrap' NFC iPhone case, Jan. 24, 2014 (Jan. 24, 2014), XP055449624.

\* cited by examiner

PROTECTIVE JACKET WITH A KICKSTAND

BACKGROUND

The emergence and popularity of mobile computing has made portable computing devices a smote in today's marketplace due to their compact design and light weight. Tablet computers are examples of portable computing devices that are widely used. Tablet computers generally employ a touchscreen on a display surface of the tablet that may be used for both viewing and input. Users of tablets may interact with the touchscreen via finger or stylus gestures. As an example, an on-screen, keyboard may be illustrated on the touchscreen surface for entering characters.

BRIEF DESCRIPTION OF THE DRAWINGS

Some examples of the present application are described with respect to the following figures.

DETAILED DESCRIPTION

Figure 1:
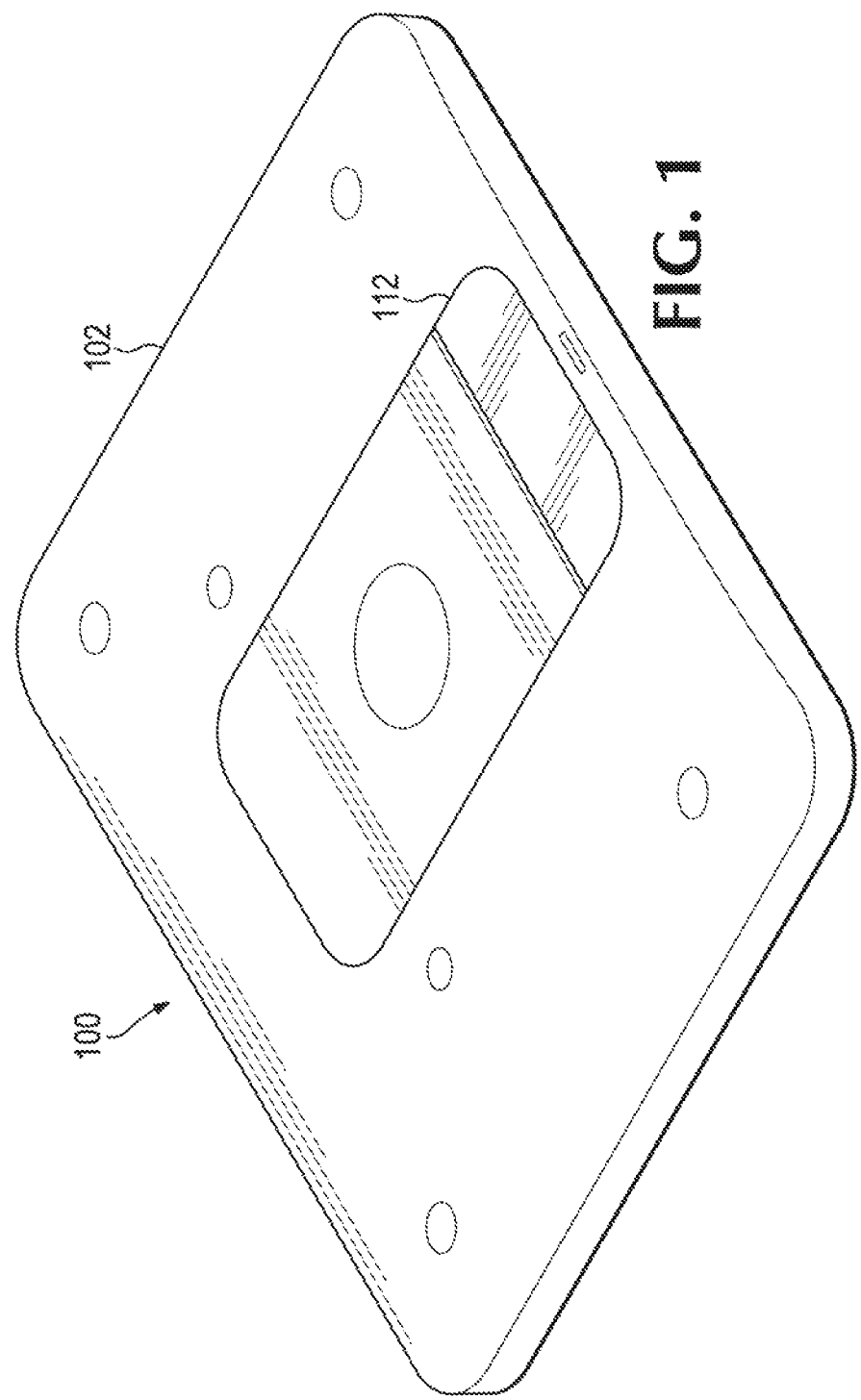
FIG. 1 illustrates a protective jacket for a portable computing device, according to one example.

While using a portable computing device such as a tablet computer, it may be desirable to protect the device from external environment, or to make the device tunable for tough environments. For example, the protective jacket may prevent damage to the device from accidental drops and other external environmental conditions such as water/liquid, dirt, dust, and debris.

In addition, it may be desirable to have such a protective jacket to expand the functionalities of the device by providing electronic device readers such as a smart card reader that cm receive a smart card (e.g., security card). However, one of the challenges presented by providing a protective jacket with expanded functionalities is protecting the device reader (and electronic device) from external environment such as dust and water.

Examples disclosed herein address the above needs and challenges by providing a protective jacket with an integrated electronic device reader (e.g., smart card reader). The protective jacket includes a cover movably attached to the jacket to seal and protect an electronic device inserted into the electronic device reader from external environment, when the cover is in a closed position. The cover can also function as a kickstand to support the computing device in a plurality of viewing angles, when the cover is in an open position. An inner portion of the cover can include a rubber member to protect the device from water and dust. Accordingly, the jacket can serve a dual function as a kickstand and a protective covering from ingress of water and solids. Further, the protective jacket can include an antibacterial coating and conform to at feast an IP54 rating protection (e.g., for use in the healthcare industry).

In one example, a protective jacket for enclosing a portable computing device includes an electronic reader to receive an electronic device, and a cover movably attached to the jacket. The cover is to seal the electronic reader when the cover is in a closed position and to function as a kickstand to support the device in a plurality of viewing angles when the cover is in an open position.

In another example, a protective jacket for enclosing a back surface and sidewalls of a portable computing device includes a smart card reader to receive a smart card and a kickstand rotatably coupled to the jacket. The kickstand is to support the device in a plurality of viewing angles when the kickstand is in an extended position and to cover the smart card reader and the smart card when the kickstand is in a retracted position.

In another example, a system includes a portable computing device including a display surface and a back surface opposite the display surface, and a protective jacket for enclosing at least the back surface and sidewalls of the device. The jacket includes a recess portion including a smart card reader to receive a smart card. The jacket also includes a kickstand rotatably coupled to the jacket via a hinge. The kickstand is to support the device in a plurality of viewing angles when the kickstand is in an extended position and to cover the recess portion when the kickstand is in a retracted position.

As used herein, "portable computing device" and "device" may be used interchangeably and refer to anyone of various tablets, smartphones, cellular telephones, personal digital assistants (FDAs), laptops, notebooks, "phablet" devices (i.e., phone/tablet devices), computers, and any other similar electronic devices. As used herein, "kickstand" refers to a support member connected to a portable computing device for propping up the device in a plurality of viewing angles. As an example, the kickstand may be a rectangular frame that flips out or pivots from a portion of a perimeter of the jacket (or device) and makes contact with a surface in various positions for propping up the device at the various viewing angles. As a result, the computing device may be kept upright via the kickstand without leasing the device against another object or with the aid of a user.

Referring now to the figures, FIG. 1 illustrates a protective jacket for a portable computing device, according to one example. Computing device 100 can be a tablet computer, for example. However, device 100 can be any portable computing device such as a laptop computer, a notebook computer, a mobile device (e.g., a smartphone), a "phablet" device (i.e., phone/tablet device), a hybrid computer, or any other portable computing device.

Device 100 can include a display surface and a back surface opposite the display surface. Device 100 can include sidewalk around a perimeter of the device 100. For example, device 100 can include four (4) sidewalls (a left sidewall, a right sidewall, a top sidewall, and a bottom sidewall). Device 100 can be fitted with a jacket 102 for enclosing at least the back surface and sidewalls of the device 100. Jacket 102 can be constructed from at least one of metal, plastic, fiber, resin, and any other suitable material.

Figure 2:
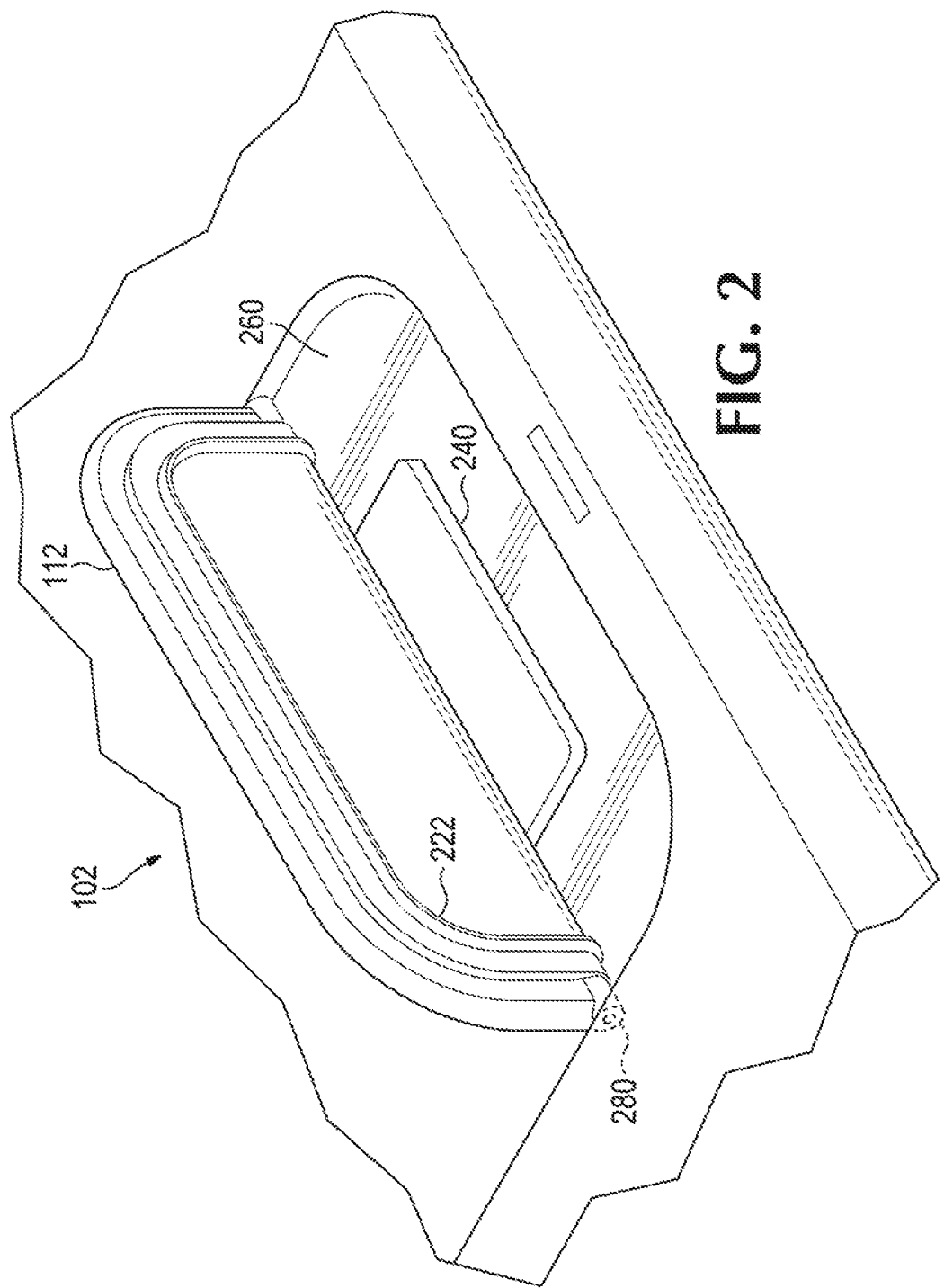
FIG. 2 illustrates a protective jacket including a cover to seal an electronic device and to functions as a kickstand, according to one example.

Jacket 102 can expand the functionality of the device 100 by providing an integrated electronic device reader such as a smart card reader to receive a smart card (shown in FIG. 2). A smart card can include a security card, for example. Thus, jacket 102 can provide an extra layer of security to the device 100 to simplify logins and prevent unauthorized access to data on the device 100 or private network in sensitive environments (e.g., healthcare/medical) where multi-authentication and secure login procedures may be desirable. In some examples, the smart card reader is provided in a recessed portion of the back surface of the jacket 102 to receive and connect the smart card to the smart card reader. Jacket 102 includes a cover 112 to seal recess portion of the jacket 102 (including fee smart card and smart card reader) from external environment such as liquid (e.g., water, chemicals, etc.), dust, dirt, and debris.

Cover 112 is adapted to move to the open position, and the closed position, as needed, while movably attached to the jacket 102 via a hinge. Cover 112 includes an inner portion and an outer portion. In one example, the inner portion of cover 112 includes a rubber member (shown in FIG. 2) to seal the smart card reader/smart card from external environment. Cover 112 can be made from a robust material such as aluminum or die cast metal, for example. In the example of FIG. 1, the cover 112 is in a closed position, sealing the recess portion containing the smart card reader and smart card (if in use). In the open, position, cover 112 can function as a kickstand to support the device 100 in a plurality of viewing angles. In some examples, cover 112 can open to about 120 degrees relative to the back surface of the jacket 102 and create a kickstand to support the device 100 during use such that the user can interact with the display surface of the device 100 (e.g., via touch gesture and/or stylus). In certain examples, cover 112 can create a 15 degree display angle.

In some examples, jacket 102 complies with at least an IP54 rating protection against solid and liquid ingress to the device 100 and can include an antibacterial coating, which may be desirable in certain use cases such as the healthcare/medical industry. As used herein, "IPXX rating" refers to a specific ingress protection (IP) standard marking or code. The IP standard classifies and rates the degree of protection provided against the intrusion (including body parts such as hands and fingers), dust, accidental contact, and water by mechanical casings and electrical enclosures, and is published by the International Electrotechnical Commission (IEC). In the "IPXX" rating, the first digit indicates the level of protection that the enclosure provides against access to hazardous parts and the ingress of solid foreign objects, and the second digit indicates the level of protection that the enclosure provides against harmful ingress of water. In certain examples, jacket 102 can include an antibacterial coating.

In some examples, the jacket 102 is removably attached to the device 100. In such an example, the device 100 can be separated or removed from the jacket 102 (e.g., with little or no effort). In other examples, the jacket 102 is integrated with the deice 100. In such an example, the device 100 may be separated from the jacket 102 using tools to separate the attachment of the device 100 to the jacket 102.

FIG. 2 illustrates a protective jacket including a cover to seal an electronic device and to function as a kickstand, according to an example. Cover 112 is movably attached to the jacket 102 via a hinge 280. Accordingly, cover 112 can rotate about the hinge 280 to move the cover 112 between the open position and the closed position. In the open position, the cover 112 is a kickstand to support the device 100 in a plurality of viewing angles. In the closed position, cover 112 can seal a recess portion 260 of the jacket 102 to prevent liquid and/or solid ingress. An inner portion of the cover 112 can include a rubber member 222 to prevent unwanted ingress of such external materials.

In the example of FIG. 2, cover 112 is in the open position and reveals an electronic device such as a smart card 240 inserted into a smart card reader (not shown) within the recess portion 260 of the jacket 102. Thus, the smart card reader can be integrated with the jacket 102. Smart card 240 can include a security card, for example. As used herein, "smart card" is any pocket sized card with embedded integrated circuits. Smart card 240 can provide identification, authentication, data storage and application processing functionalities for device 100.

Figure 3:
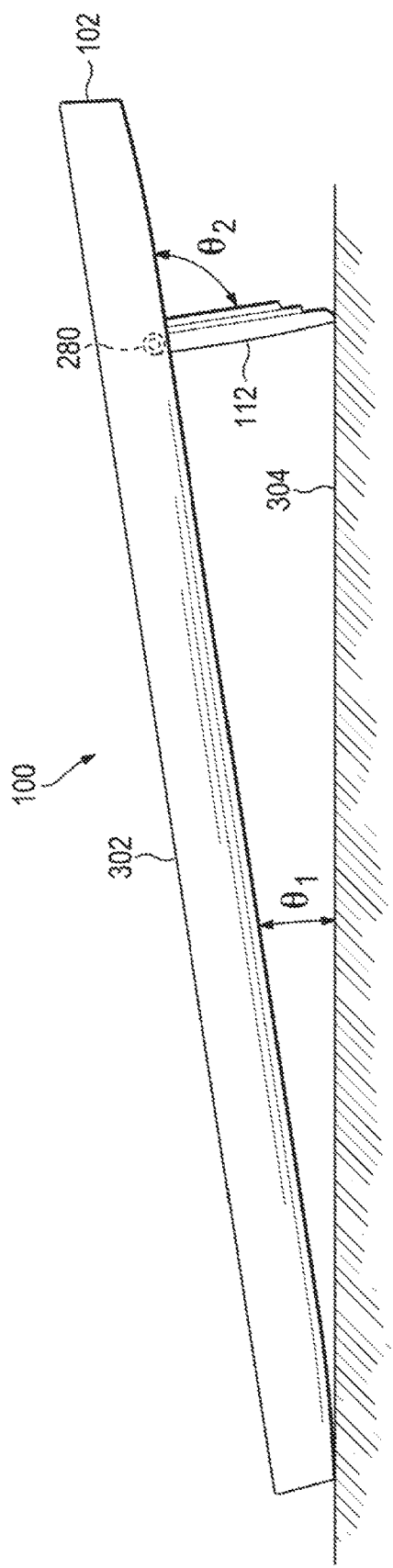
FIG. 3 illustrates a protective jacket including a cover that functions as a kickstand, according to one example.

FIG. 3 illustrates a protective jacket including a cover that functions as a kickstand, according to an example. Device 100 is propped up via the cover 112 like a kickstand at an angle $\theta_1$ from a surface 304, as an example. Surface 304 may be a level surface, such as, for example, a desk or table. However, surface 304 may be a surface that is not level. To function as a kickstand, cover 112 can rotate about the hinge 280 (or axis) at an angle $\theta_2$. Accordingly, the user can view a display surface 302 in a plurality of viewing angles and interact with the device 100. Display surface 302 may be a touchscreen, allowing a uses to interact directly with content displayed by touching the screen with simple or multi-touch gestures. In some examples, the user may be able to view the display surface 302 at an appropriate viewing angle by adjusting the covet/kickstand 112. In certain examples, cover 112 can flip open to about 120 degrees (i.e., $\theta_2=120°$) and create a 15 degree viewing angle (i.e., $\theta_1=15°$).

Figure 4:
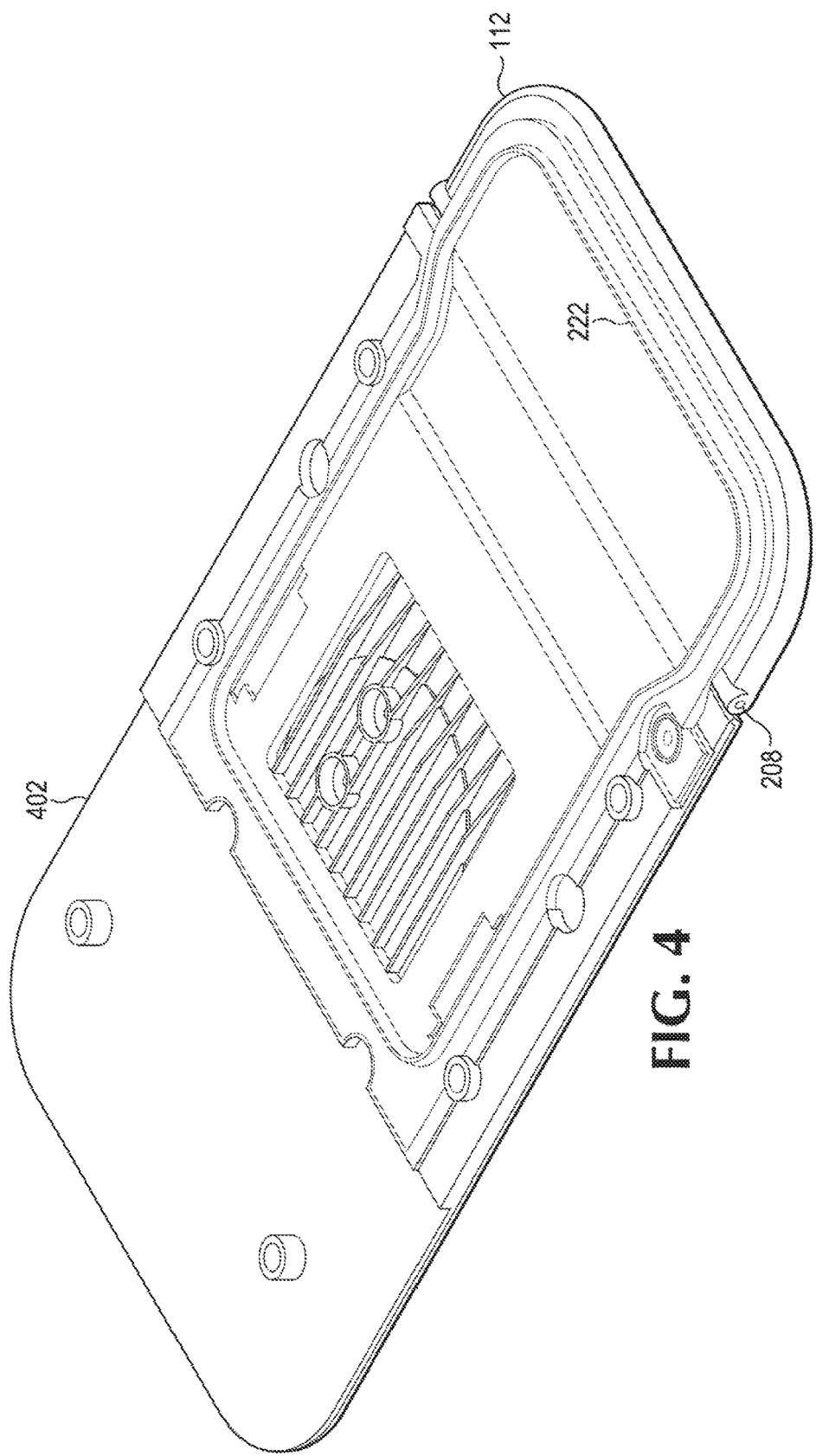
FIG. 4 illustrates an inner portion of a cover of a protective jacket including a rubber member, according to one example.

FIG. 4 illustrates an inner portion of a cover of a protective jacket including a rubber member, according to one example. In one example, cover 112 can be movably coupled to a portion 402 of the back surface of the jacket 102. The portion 402 of the back surface of the jacket 102 and the cover 112 can be made from a different material than the remaining portions of the jacket 102. For example, the portion 402 including the cover 112 can be made from aluminum or die cast metal. Cover 112 can include rubber member 222 to protect the smart card reader and smart card 240 from external environment such liquid and solid, when the cover 112 is in the closed position. Cover 112 can also function as a kickstand when the cover 112 is in the open position.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A protective jacket for device, the jacket comprising: a smart card reader to receive a smart card a recess formed at a back surface of the jacket; and a cover patterned to fit an opening of the formed recess, wherein the cover includes a line of rubber disposed along a cover's inner periphery to seal the formed recess and the smart card when the cover is in a retracted position, wherein the cover is to function as a kickstand to support the device in a plurality of viewing angles when the cover is rotated to form the angles from the back surface.

2. The jacket of claim 1 further comprising a hinge that connects the cover to the back surface of the jacket, wherein the cover rotates about the hinge.

3. The jacket of claim 2, wherein the hinge is disposed on opposite sides of the formed recess.

4. The jacket of claim 1, wherein the cover includes an outer portion and wherein the outer portion includes at least one of an aluminum and die cast metal.

5. The jacket of claim 1, wherein the jacket includes the formed recess to access an electronic reader that is disposed and integrated inside the jacket.

6. The jacket of claim 1, wherein the jacket is removably attached to the device.

7. The jacket of claim 1, wherein the jacket is integrated with the device.

8. The jacket of claim 1, wherein the jacket includes an antibacterial coating.

9. The jacket of claim 1, wherein the jacket meets an Ingress Protection (IP) rating of at least IP54.

10. A jacket for a portable computing device, the jacket comprising: a recess formed at a back surface of the jacket to receive a smart card reader and a smart card; and a cover patterned to fit an opening of the formed recess, wherein the cover includes a line of rubber disposed along a cover's inner periphery to seal the formed recess and the smartcard when the cover is rotated in a coplanar position with the back surface, wherein the cover functions as a kickstand when the cover is extended to form an angle from the back surface; and a hinge that connects the cover to the back surface of the jacket.

11. The jacket of claim 10, wherein the hinge is disposed on opposite sides of the formed recess.

12. The jacket of claim 10, wherein the jacket is integrated to the portable computing device.

13. A system comprising: a device; and a jacket attached to the device, the jacket further comprises: a recess formed at a back surface of the attached jacket to receive a smart card reader and a smart card; and a cover patterned to fit an opening of the formed recess, wherein the cover includes a line of rubber disposed along a cover's inner periphery to seal the formed recess and the smartcard when the cover is rotated in a coplanar position with the back surface, wherein the cover is to function as a kickstand when the cover is extended to form an angle from the back surface.

14. The system of claim 13 further comprising a hinge that connects the cover to the back surface of the jacket, wherein the cover rotates about the hinge.

15. The system of claim 14, wherein the kickstand rotates about the hinge between retracted and extended positions relative to the back surface of the jacket.

\* \* \* \* \*

UNITED STATES PATENT AND TRADEMARK OFFICE
CERTIFICATE OF CORRECTION

PATENT NO. : 10,061,347 B2
APPLICATION NO. : 15/309824
DATED : August 28, 2018
INVENTOR(S) : Rudy Widiaman et al.

Page 1 of 1

It is certified that error appears in the above-identified patent and that said Letters Patent is hereby corrected as shown below:

On the Title Page

In item (57), ABSTRACT, in Column 2, Line 1, delete "computer" and insert -- computing --, therefor.

In item (57), ABSTRACT, in Column 2, Line 2, delete "included" and insert -- includes --, therefor.

In item (57), ABSTRACT, in Column 2, Line 4, before "the electronic" insert -- seal --.

Signed and Sealed this
Eighth Day of January, 2019

Andrei Iancu
*Director of the United States Patent and Trademark Office*